United States Patent
Salenz et al.

(10) Patent No.: US 6,451,138 B2
(45) Date of Patent: *Sep. 17, 2002

(54) METHOD AND DEVICE FOR CHARGING AND DISCHARGING A SHORT-CYCLE AND/OR COATING PRESS

(75) Inventors: Dieter Salenz, Zaisenhausen; Peter Rapp, Eppingen, both of (DE)

(73) Assignees: Dieffenbacher Maschinenfabrik GmbH, Zaisenhausen (DE); Maschinenfabrik J. Dieffenbacher GmbH & Co., Eppingen (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/167,716

(22) Filed: Oct. 7, 1998

(30) Foreign Application Priority Data

Oct. 7, 1997 (DE) .......................................... 197 44 284

(51) Int. Cl.[7] .......................... B30B 15/30; B30B 15/32
(52) U.S. Cl. ........................ 156/60; 156/538; 156/580; 156/583.1; 100/315; 100/215; 100/218; 100/295
(58) Field of Search .......................... 156/60, 538, 580, 156/583.1, 307.7; 100/215, 218, 295, 315

(56) References Cited

U.S. PATENT DOCUMENTS

| 3,655,316 A | * | 4/1972 | Husges ........................ 425/161 |
| 3,909,343 A | * | 9/1975 | Posselt ........................ 156/538 |
| 3,977,535 A | | 8/1976 | Huesges et al. ................ 214/1 |
| 3,987,917 A | | 10/1976 | Huesges et al. ............ 214/152 |
| 4,253,891 A | | 3/1981 | Brussel ........................ 156/60 |
| 4,424,092 A | | 1/1984 | Salenz ........................ 156/391 |
| 5,019,206 A | | 5/1991 | Bielfeldt ..................... 156/538 |

FOREIGN PATENT DOCUMENTS

| CA | 2092110 | 9/1995 |
| CA | 2198052 | 8/1997 |
| DE | 19 11 764 | 9/1970 |

(List continued on next page.)

OTHER PUBLICATIONS

Abstract of German patent application 28 25 206 filed Jun. 1978.

*Primary Examiner*—Katherine A. Bareford
(74) *Attorney, Agent, or Firm*—Foley & Lardner

(57) ABSTRACT

The invention is a method, and its accompanying apparatus, for charging and discharging short-cycle and/or coating presses with layered pressing material. In order to reduce the charging and discharging times, the method entails inserting a first transport device, or charging device, having a plurality of clamping devices into a charging region and inserting a second transport device having a plurality of suction devices into a pressing chamber, wherein the first and second transport devices are inserted transverse to a longitudinal central axis from a pair of supply axes to a pair of charging and discharging axes. The pressing material is clamped in the charging region and a plate is accepted in the pressing chamber; the first transport device is then moved into the pressing chamber and the second transport devices into a discharging region. The pressing material is then deposited onto a lower heating element and the first transport device is removed from the pressing chamber and a pressed plate is deposited in the discharging region. Next, the first transport device is withdrawn from the pressing chamber and the second transport device is withdrawn from the discharging region. The first and second transport devices are withdrawn in a direction transverse to the longitudinal central axis from the pair of charging and discharging axes to the pair of supply axes. Last, the transport devices are returned to an original position for a new cycle.

32 Claims, 9 Drawing Sheets

FOREIGN PATENT DOCUMENTS

| | | |
|---|---|---|
| DE | 23 63 795 | 11/1974 |
| DE | 28 47 273 | 5/1980 |
| DE | 32 46 720 | 6/1984 |
| DE | 35 03 156 | 1/1987 |
| DE | 39 14 866 | 11/1990 |
| DE | 42 09 496 | 9/1993 |
| DE | 42 25 248 | 2/1994 |
| DE | 43 13 012 | 10/1994 |
| DE | 196 06 132 | 8/1997 |
| EP | 0 582 093 | 2/1994 |

* cited by examiner

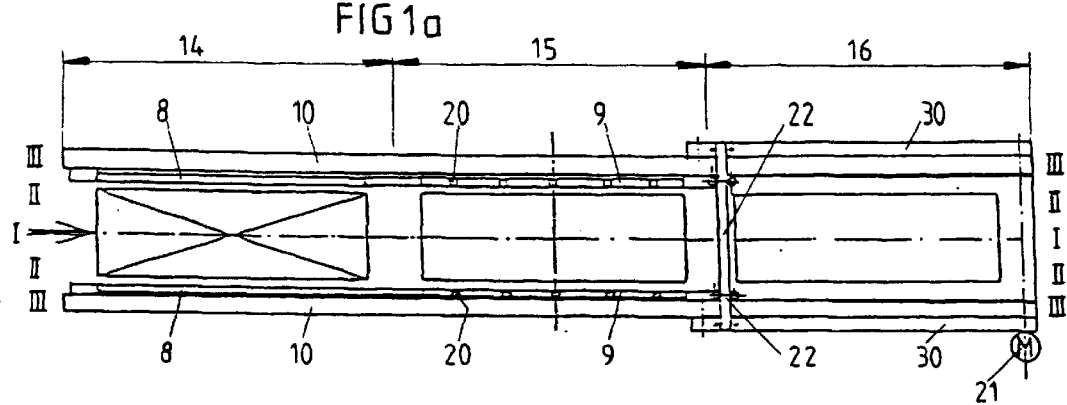
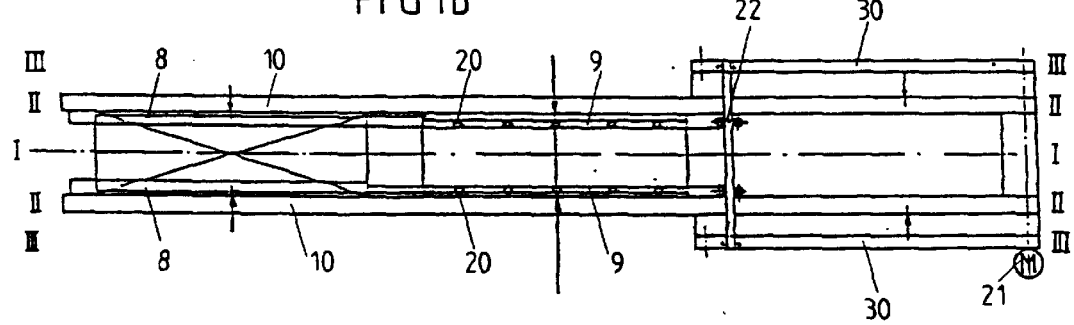
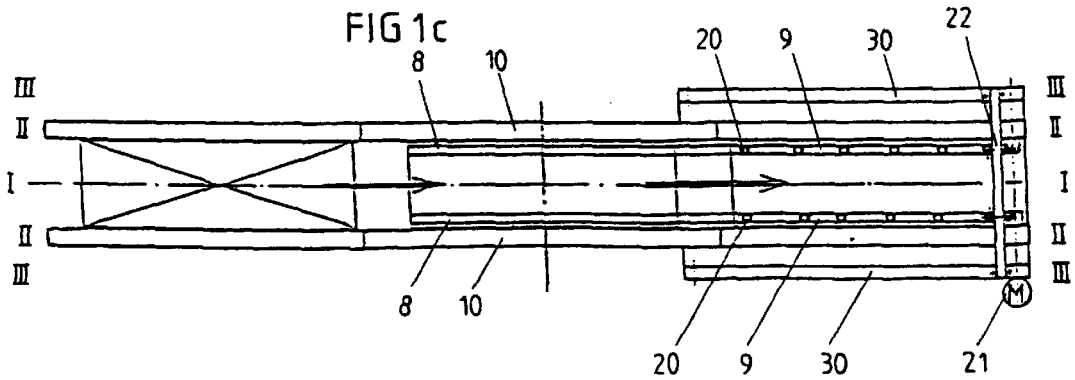
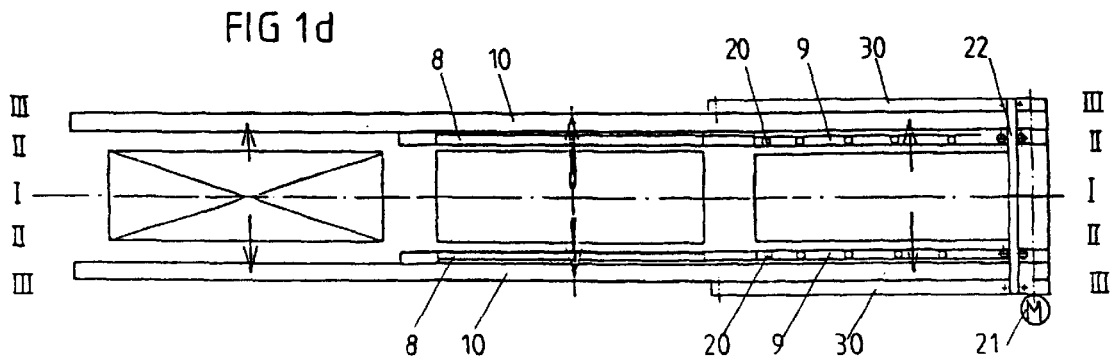

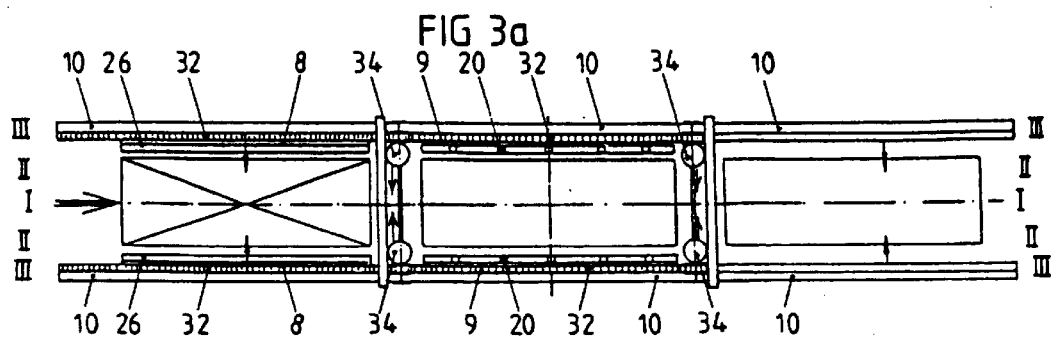
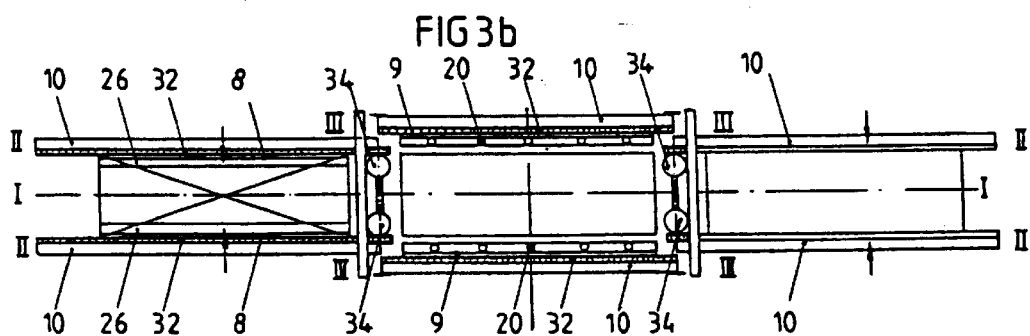
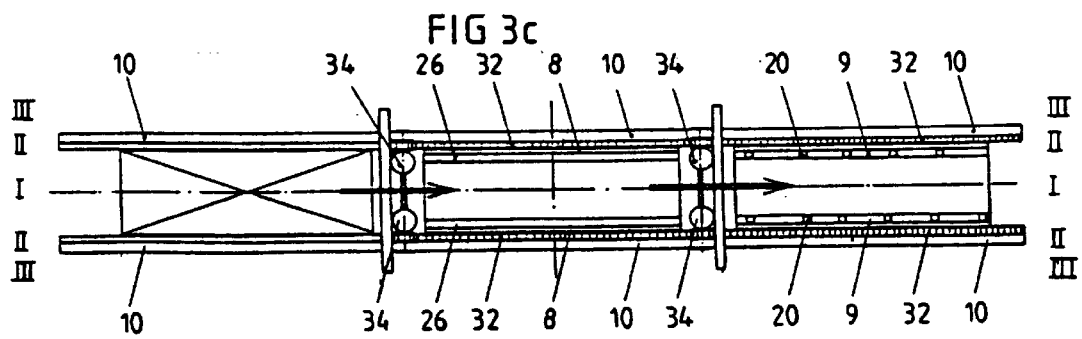
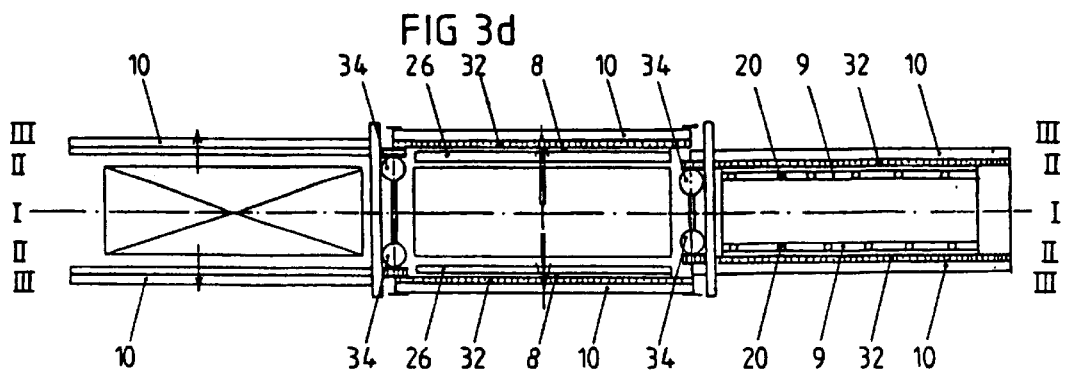

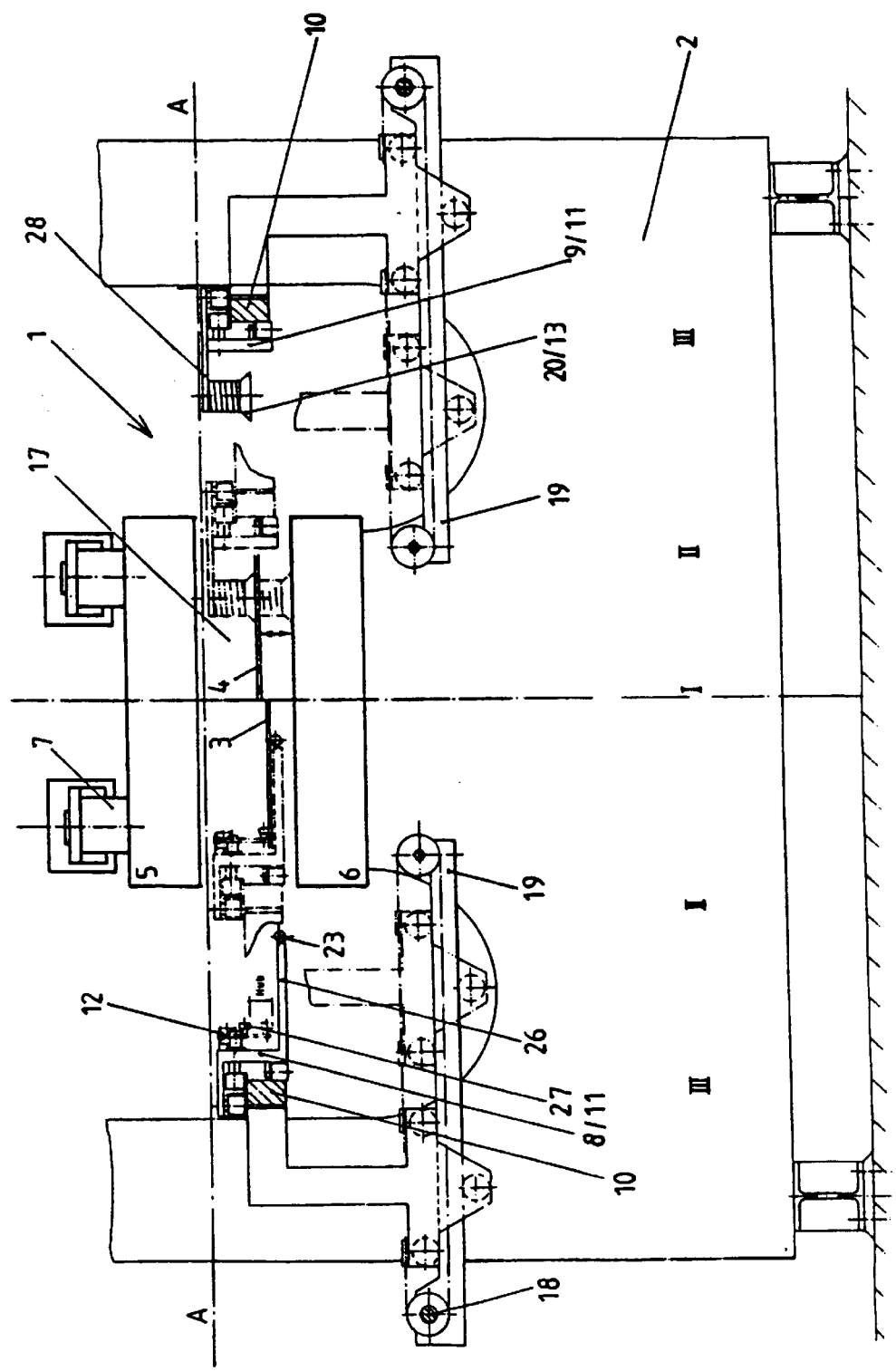

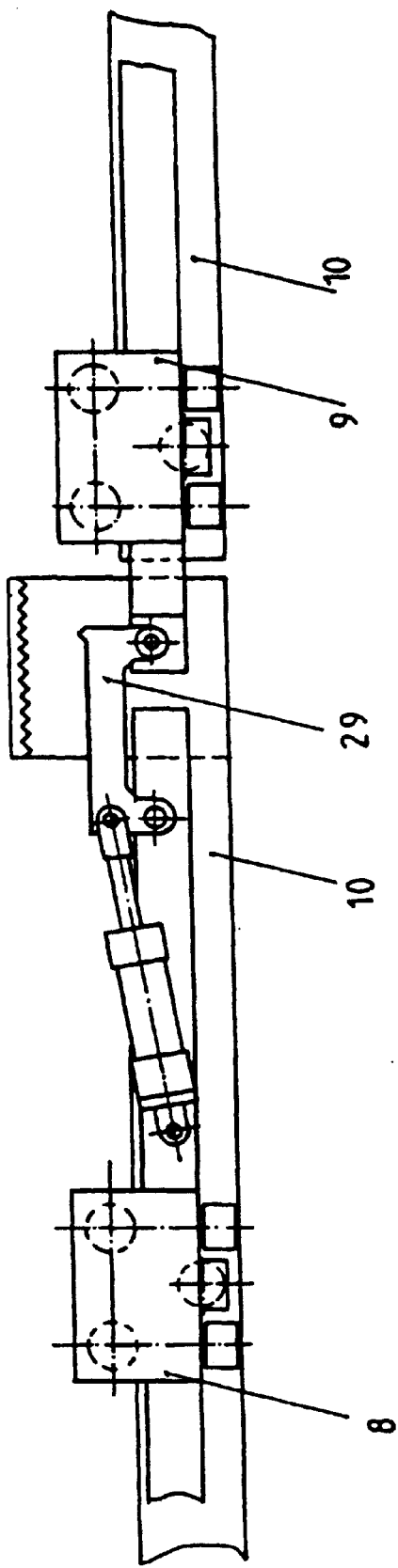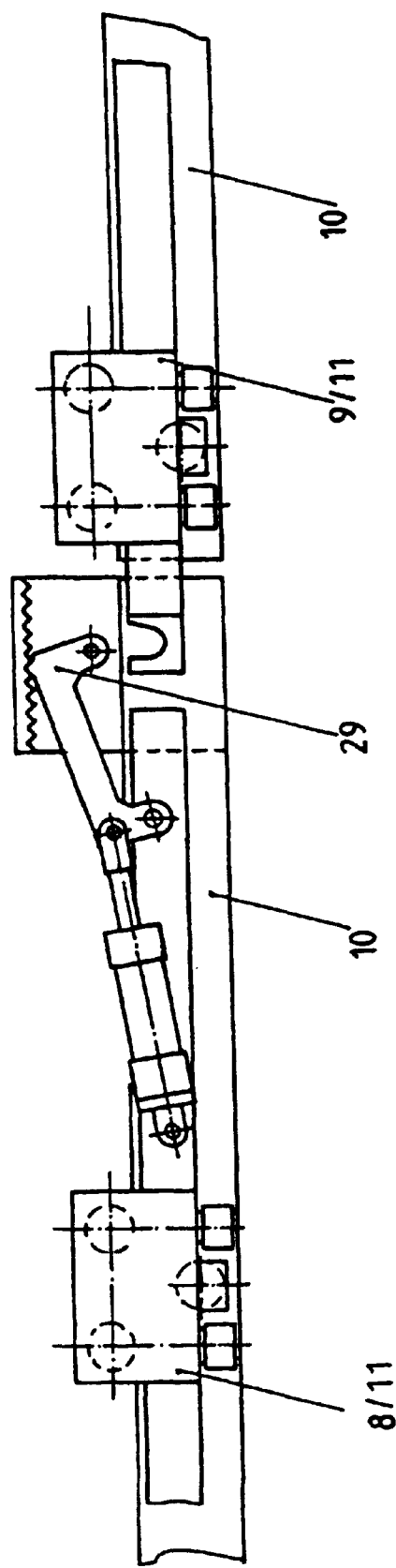

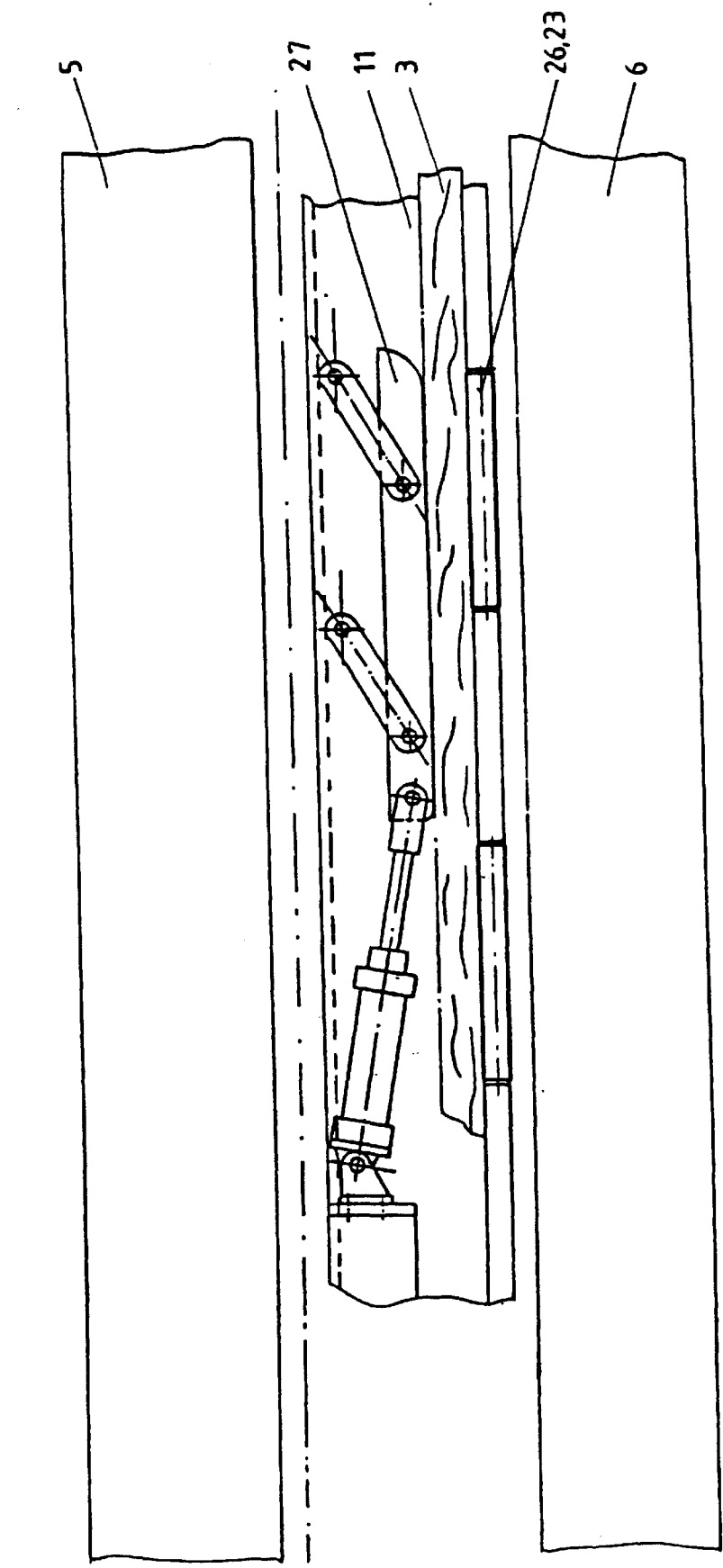

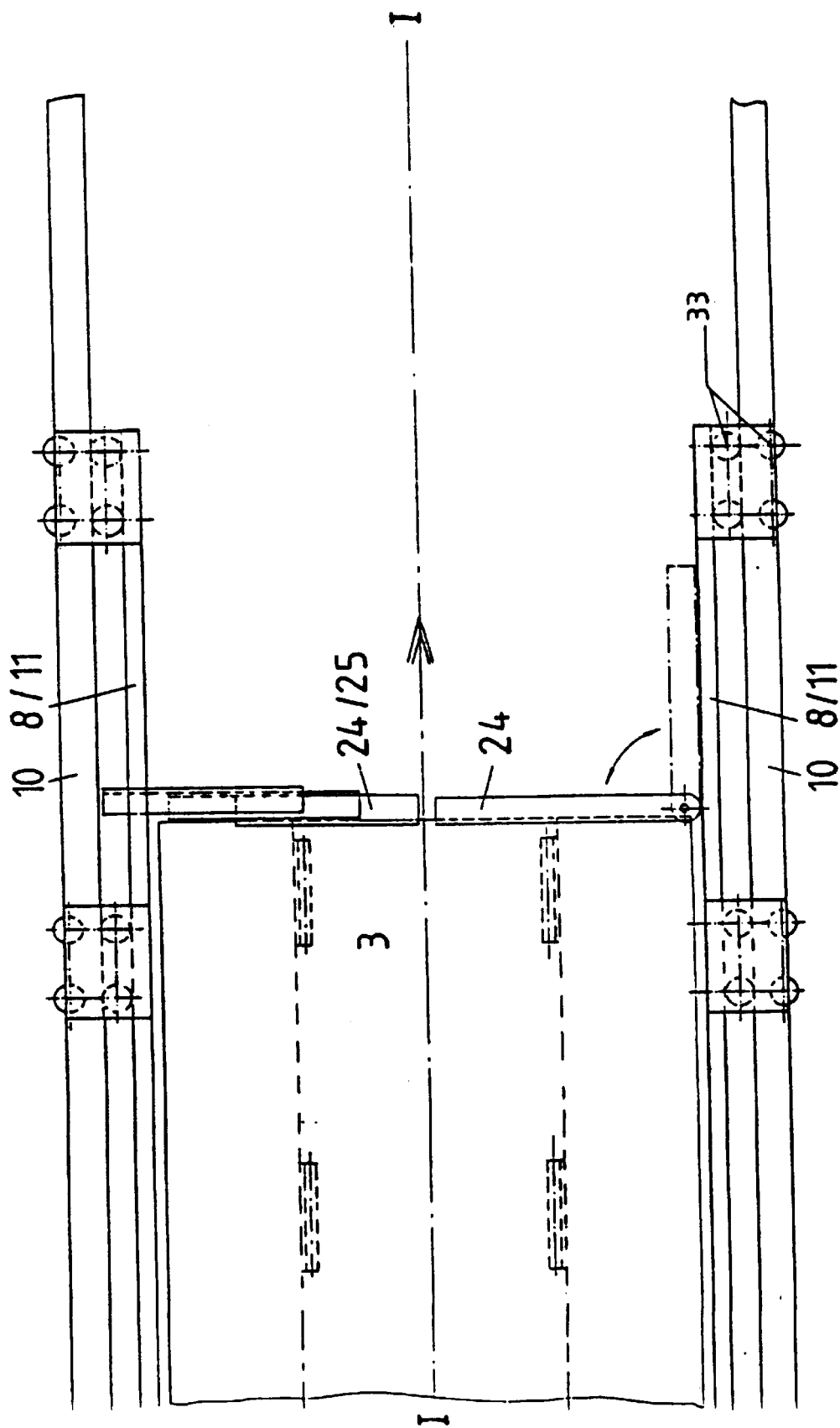

METHOD AND DEVICE FOR CHARGING AND DISCHARGING A SHORT-CYCLE AND/OR COATING PRESS

BACKGROUND OF THE INVENTION

1. Field of the Invention

The invention relates to a method for charging and discharging short-cycle and/or coating presses with layered pressing material which comprise carrier plates with topside and bottom-side enhancement layers made from thermosetting synthetic resin or thermosetting synthetic resin films, in which a transport device, moveable between the coating, press, and depositing tables is provided with clamping and suction devices. The clamping devices grip the pressing material on both longitudinal sides and move into the pressing chamber, deposit the pressing material, and move out of the pressing chamber. After the subsequent pressing operation, the press will then be opened, and the finished plate is sucked up by the inserted suction devices, lifted, and moved out of the pressing chamber. The invention also relates to a device for carrying out the method according to the invention.

2. Related Prior Art

A similar method, and its accompanying system, is disclosed in DE 19 11 764 A1 and DE 23 63 795 A1. According to the aforementioned method and system, to execute transverse movements to charge the press and deposit the pressing material, the pressing material is gripped on the outer edge by clamping elements and inserted into the pressing chamber. To insert the discharging device into the short-cycle and/or coating press, however, various kinematic, moveable elements are utilized for accepting the finally pressed plate. As a result, separate control functions must be used and the resultant mechanical design has a relatively large number of different functional parts, and thus is not only complicated, but is also demanding to maintain.

Different widths B1 and B2 are compensated for by varying the approach of the clamping and support elements, but with the disadvantage that, in the case of thin wide pressing material, the inherent weight of the pressing material causes so large a sag that the lower surface or the film of the pressing material rubs on the pressing plate of the lower pressing/heating plate and the product is damaged. The problem is partially solved by setting a larger distance to the pressing/heating plate, which results in a disadvantage when depositing the pressing material because of increased dropping (depositing) heights and the risk associated therewith, of displacing the pressing material or films on the carrier plate. Practically, to overcome this problem the point of attack of the upper clamping roller, with respect to the support elements, is displaced so far outward that the pressing material is deformed in accordance with the bending line in order to prevent rubbing of the pressing material. The risk of clamping marks disadvantageously exerts an influence in the case of this clamping, particularly given thin pressing material with sensitive films. This means that the surface quality of the product is impaired.

The problem of the sag in the case of thin and wide pressing packages was solved by DE 39 14 866 A1, which utilizes support strips inserted in a transverse fashion below the pressing material in accordance with the insertion path, depending on the width B1 or B2 and the sagging response and are inserted into the press by means of the support and transport belts arranged on the support strips. The relatively large depositing height necessitated by the design of the support belts is disadvantageous. Furthermore, extremely high positive and negative accelerations for shortening the mechanical charging times are not possible because the package of pressing material is displaced by the forces acting when the static friction is exceeded.

Charging and discharging devices of short-cycle presses according to DE 28 47 273 A1 and DE 32 46 720 A1 operate by driving the gripper clamping strips and the sucker strip tools with the same parallelogram linkage system. The guiding arms, which can mostly be swiveled out pneumatically, pursue a sinusoidal movement, as a result of which the acceleration cycles and braking operations by means of damping elements, in part additional, in the end positions of the pressing material tray and/or pressing material holder can no longer be exactly repeated. This applies, in particular, in the case of different format widths with effects on the path lengths and the operating speeds, particularly, in the case of transverse movements in the required millisecond range. It is a further disadvantage in these swiveling arm systems that the compensation of relatively large differences in format width entails relatively large lever lengths, and thus relatively large flywheel forces.

According to a further patent DE 35 03 156 A1, the transverse insertion of the support strips with a different sagging response of the pressing material, principally, in a similarly advantageous way as according to DE 39 14 866 A1, with the difference that the package of pressing material is inserted into the press on this support strip, it being the case that during the insertion (charging) movement the package of pressing material remains fixed on the support surface of the support strips by means of vacuum suction nozzles, with the disadvantage that for the purpose of shortening the mechanical charging times in the case of high accelerating and braking forces only the lower film remains fixed, and the clamping plate situated above can be displaced with the upper film, which becomes even more critical in the case of a double film covering. This renders it impossible for the pressing material to be inserted quickly into the pressing chamber without detaching or displacing the upper film.

SUMMARY OF THE INVENTION

It is an object of the invention to allow for the insertion of a package of pressing material, given a different sagging response of the package of pressing material, into the short-cycle and/or coating press even in the case of extremely high accelerating or decelerating forces.

It is another object of the invention to reduce the mechanical charging times without displacing the package of pressing material.

It is yet another object of the invention to be able to reliably deposit the pressing material onto the lower pressing plate without displacing the film.

It is a further object of the invention to reduce the mechanical charging and discharging times, that is, reduce the time of the production cycle as a whole.

Accordingly, the invention consists of a method for charging and discharging short-cycle and/or coating presses with layered pressing material in a pressing chamber which is located between a charging region and a discharging region and in which the pressing material is pressed into a plate, the method comprising:
a) opening the pressing chamber;
b) inserting a first transport device having a plurality of clamping devices into the charging region wherein the first transport device is inserted linearly in a direction transverse to a longitudinal central axis from a pair of supply axes to a pair of charging and discharging axes, wherein each supply axis is located on an opposite side of the longitudinal central axis, wherein each charging and discharging axis is located on an opposite side of the longitudinal central axis between the longitudinal central axis and its respective supply axis, and wherein each charging and discharging axis is located further from the longitudinal central axis than from its respective supply axis;

c) inserting a second transport device having a plurality of suction devices into the pressing chamber, wherein the second transport device is inserted linearly in a direction transverse to the longitudinal central axis from the pair of supply axes to the pair of charging and discharging axes;

d) clamping the pressing material in the charging region e) depositing pressing material in the pressing chamber;

f) moving the first transport device into the pressing chamber while jointly moving the second transport device into the discharging region, wherein the first and second transport g) depositing the pressing material onto a lower heating element in the pressing chamber removing h) depositing the pressed plate in the discharging region;

i) withdrawing the first transport device from the pressing chamber and the second transport device from the discharging region, wherein the first and second transport devices are withdrawn in a linear direction transverse to the longitudinal central axis from the pair of charging and discharging axes to the pair of supply axes; and j) returning the first transport device to a first original position for a new cycle; and n) returning the second transport to a second original position for a new cycle.

An additional method for charging and discharging short-cycle and/or coating presses with layered pressing in a pressing chamber which is located between a charging region and a discharging region and in which the pressing material is pressed into a plate, the method comprising:

a) inserting a first transport device having a plurality of clamping devices into the charging region, wherein the first transport device is inserted linearly in a direction transverse to a longitudinal central axis from a pair of supply axes to a pair of charging and discharging axes, wherein each supply axis is located on an opposite side of the longitudinal central axis, wherein each charging and discharging axis is located on an opposite side of the longitudinal central axis between the longitudinal central axis and its respective supply axis, and wherein and each charging and discharging axis is located further from the longitudinal central axis than from its respective supply axis;

b) inserting a second transport device having a plurality of suction devices into the pressing chamber, wherein the second transport device is inserted linearly in a direction transverse to the longitudinal central axis from the pair of supply axes to the pair of charging and discharging axes;

c) clamping the pressing material to the first transport device;

d) opening the pressing chamber;

e) suctioning the plate in the pressing chamber to the second transport device;

f) moving the first transport device into the pressing chamber and the second transport device into the discharging region;

g) depositing the pressing material onto a lower heating element in the pressing chamber;

h) removing the first transport device from the pressing chamber, wherein the first transport device is withdrawn in a linear direction transverse to the longitudinal central axis from the pair of charging and discharging axes to the pair of supply axes;

i) depositing the pressed plate in the discharging region;

j) withdrawing the second transport device from the discharging region, wherein the second transport device is withdrawn in a linear direction transverse to the longitudinal central axis from the pair of charging and discharging axes to the pair of supply axes;

k) returning the first transport device to a first original position; and l) returning the second transport device to a second original position.

There is also provided a device for charging and discharging short-cycle presses, comprising a charging truck comprising at least two support spars, wherein the charging truck is movable and is guided by the support spars on a pair of guide rails; a plurality of clamping devices fastened to the support spars; a discharging truck comprising at least two support spars, wherein the discharging truck is movable and is guided by the support spars on the pair of guide rails; and a plurality of suction devices fastened to the support spars of the discharging truck.

BRIEF DESCRIPTION OF THE DRAWINGS

FIGS. 1a, 1b, 1c, 1d, and 1e show the kinematic sequence (a to e) of the device according to the invention for charging and discharging a short-cycle press of a first design.

FIGS. 3a, 3b, 3c, and 3d show the kinematic sequence (a to d) of the device according to the invention for charging and discharging a short-cycle press of a third design

FIG. 5 is a front view of the device for charging and discharging according to the invention.

FIGS. 7a and 7b shows the design details of the coupling for connecting the support spar of the charging and discharging truck.

FIG. 8 shows the clamping mechanism for the pressing package on an enlarged scale.

FIG. 9 shows two windscreen devices.

DETAILED DESCRIPTION OF THE DRAWINGS

Figure 1E:
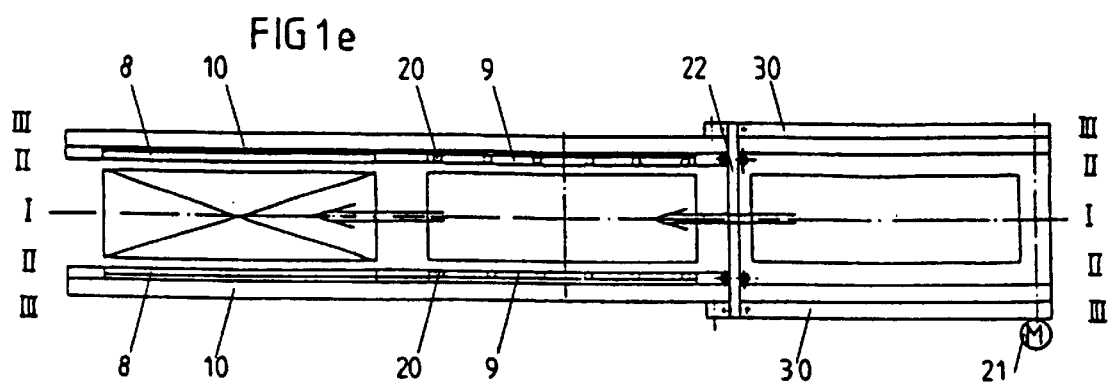

The method consists in that the clamping and discharging device of the charging and discharging trucks, that is to say that the device according to the invention as a whole can, for the purpose of rapid insertion and withdrawal as well as for effective acceptance of the pressing material, be inserted in a fashion projecting into the pressing chamber. The width of the inserted portion is wide enough across a longitudinal central axis I—I that the pressing material is supported on support elements. The support elements project far into the pressing chamber on both longitudinal sides in accordance with the width of said material, and thus finds a support for insertion which is as free from sagging as possible. It is thereby possible for pressing packages and the finished plates of arbitrary widths to be transported quickly and damage free.

By contrast with the prior art, the method according to the invention and the device according to the invention have the following advantages:

First, due to the optimum support of the package of pressing material by means of support beams extending into the pressing chamber to an optional extent, the pressing material is support. Second, due to additional clamping by the clamping beams, it is possible for even very wide and thin (for example only 3 mm thick) packages of pressing material to be transported into the short-cycle and/or coating press without being damaged and without appreciable sagging, and also to be deposited without folds when extremely thin lightweight films are used. In contrast with the prior art (in which the clamping system must apply relatively large clamping forces to prevent the package of pressing material from sliding, because of its intrinsic weight, onto the pressing/heating plate by bending deformation), the clamping mechanism according to the invention need only apply the dynamic forces, acting horizontally on the pressing material, in conjunction with extremely steep acceleration and braking ramps of the traveling movement of the charging device to prevent sagging to an excessively large extent. This advancement is possible because the weight of the package of pressing material is taken up optimally by the support surfaces.

It is advantageous for the lifting movement of the suction devices to be carried out by an active sucker system without additional mechanical components, the suction device itself executing the suction and lifting operation. Active sucker systems or injector Venturi nozzles are provided to limit the outlay on installation. It is thereby sufficient to supply the suction devices with compressed air.

The advantageous kinematic measures and designs of the devices have created spaces between roller guides for the guide rails and the support spars, in the valves of which pressure metering displacement sensors and other pneumatic and electric switching elements are sufficiently accommodated. In this case, the units are supplied with electric power by a bus system. Such a bus system manages with at most two to four mini-lines, which can be laid virtually invisibly in the spaces formed. The overall aim of these measures and embodiments of the device is to avoid outlay on installation and excessively large cable dragging devices for supplying the charging and discharging unit.

In order to permit short cycle times, the longitudinal movements of the charging and discharging trucks are operated at high speeds. In this case, to prevent the upper films and/or papers from blowing upward and the pressing package from slipping, it is advantageous to attach a windscreen to the end face of the charging truck.

The short cycle times are also rendered possible by virtue of the fact that the opening height of the pressing chamber is very small, at up to $\leq 300$ mm. The reason for this is that the components of the device which are inserted and withdrawn are to be designed with a decidedly low overall height. The low overall height of the active suction lifters employed is particularly responsible for this. As a result, only short raising and lowering times for the movable pressing plate are involved in the pressing cycle.

The results of the method according to the invention and the device according to the invention are that relatively low pressure forces prevent the package of pressing material from slipping even in the case of very rapid insertion and very short mechanical charging times in a reliable way and without limiting the quality of the film surface.

Further advantages and embodiments of the invention may be gathered from the following descriptions, the drawings, and the claims.

The device for carrying out the method serves to charge and discharge socalled short-cycle or coating presses in a single-tier design. The middle layers for the plate to be coated can be chipboard, MDF and plywood plates which are coated on one or both sides with melamine or phenolic resin films. It is also possible to produce pure packages of melamine and phenolic resin films as high and medium pressure laminates.

In FIG. 5, the press 1 is fitted with charging and discharging devices, or first and second transport devices, which are constructed as clamping and suction devices 12 and 13, respectively. The pressing and heating plates 5, 6 press pressing material 3 or pressing package 3, (which can be chipboards, fiberboard or the like) and thereby apply enhancement coatings applied to their top and bottom sides. The pressing and coating is accomplished by: (a) pressure by means of cylinder piston arrangements 7 for exerting pressing pressure; and (b) heat from heated pressing/heating plates 5 and 6 applied to enhanced plates 4. Two transport devices are provided for charging and discharging the press 1. The first transport device can be moved between the charging region 14 and pressing region 15. The second transport device can be moved between the pressing region 15 and discharging region 16. The transport devices are guided by means of support spars 11 in or on guide rails 10 to which clamping and suction devices 12 and 13 are connected on both longitudinal sides of the central axis I—I.

As shown in FIG. 5, the charging device is represented by dashed lines, to the left of the longitudinal central axis I—I, which fall on the supply axis III—III and on the charging axis II—II, when the pressing package 3 is deposited in the pressing chamber 17. On the other hand, in the case of acceptance of the finished plate 4 the discharging device is illustrated by dashed lines, to the right of the longitudinal central axis I—I, which fall on the discharging axis II—II and on the supply axis III—III.

According to FIGS. 5 to 8, the transport device for charging comprises a bipartite charging truck 8 which can be moved longitudinally back-and-forth through the pressing/heating plates 5 and 6. In passing through the pressing/heating plates 5, 6, the transport device, can pass back-and-forth through the press frame 2 on the guide rails 10 with the support spars 11. The charging truck 8 comprises two support spars 11 to which the clamping devices 12, support beams 26, and raising/lowering clamping beams 27 are fastened. It is possible to provide many support beams 26 per side at a predetermined distance from one another, support rollers 23 being attached at their ends for the purpose of improved sliding of the pressing packages 3. The pressing packages 3 can be deeply undercut by the support beams 26.

In this case, the undercut depends solely on the length of the support beams 26, which is, in each case, a function of the width and thickness of the pressing material. Slippage or displacement of the films in the pressing package 3 during transport is prevented by the clamping beams 27. Moreover, in accordance with FIG. 9, the films are advantageously protected against being lifted by a windscreen 24 which can be swiveled in and out, or as one which has laminas 25 which can be displaced into one another telescopically, and which is arranged on the end face of the charging truck 8, that is to say the front in the charging direction. As a result, it is possible to operate at the highest driving speeds, for example 6 m/s, without the films being lifted. At the same time, ionization can be minimized. This is necessary to press the films without folds. The windscreen is designed such that it can be telescoped for differences in the widths of the pressing materials.

Instead of many support beams 26 with support rollers 23, it is also possible to provide two longitudinal support strips per longitudinal side at the ends of the support beams 26, to the inside of which the support rollers 23 are attached at a distance from one another.

The pressing packages 3 inserted into the pressing chamber 17 are deposited onto the lower pressing/heating plate 6 by loosening the clamping beams 27, simultaneously or, optionally, with a time delay, and by rapidly withdrawing the support beams 26 to the side, either simultaneously or with a time delay. The support beams 26 are withdrawn horizontally from the pressing chamber 17 by moving the two halves of the charging truck 8 with the support spars 11 and the guide rails 10 rapidly to the left and right with the aid of a motor by a drive 18 or pneumatically by an adjusting drive, in transverse rails 19.

The transport device for discharging comprises a bipartite discharging truck 9 which can be moved longitudinally back-and-forth through the pressing/heating plates 5, 6, respectively, in guide rails 10 with the support spars 11.

The discharge truck 9, in turn, comprises two support spars 11 to which the suction devices 13 with their support arms 28 and the raising/lowering active suction devices 20 are attached. The number of active suction devices 20 per longitudinal side and their insertion path relative to the longitudinal central axis I—I is determined by the width and weight of the plate 4. The active suction devices 20 can, depending on the length of the plate 4, be individually raised and individually lowered independently from one another. It is possible thereby for the plates 4, which loosen poorly from the lower pressing/heating plate 6, to be peeled off. The peeling operation requires that the upper suction device 20 be raised at the plate ends. Then, as a result, air passes under the plate 4 and the latter can be raised over its entire surface. If pressing material of different lengths is produced by the coating installation, in the case of short pressing material 3 the downward cycle is turned off for the suction devices not required. This prevents increased wear of the active suction devices 20 by placing them onto the plate edges.

As an alternative to this, instead of the active suction devices 20 it is also possible to use a sucker strip on each side with a fixed number of suckers, but only when the operator of the coating layer desires to continuously produce one size of pressing package. After the suction devices 13 are lowered and the finished plate 4 is accepted, the discharging truck 9 is rapidly moved longitudinally together with the charging truck 8. The discharging truck 9 brings the plate 4 from the pressing chamber 17 and the charging truck 8 brings the pressing package 3 into the pressing chamber 17. The rapid longitudinal movement of the charging and discharging trucks 8 and 9 and their guidance by the support spars 11 in the guide rails 10 may be carried out using ball-bearing guiding rollers 33 attached to the support spars 11.

In the case of the first exemplary embodiment, described thus far, according to FIGS. 1a to 1e, for charging and discharging, the guide rails 10 and the support spars 11 are permanently fixedly connected to one another and they respectively comprise one structural part to the left and right. A drive 21 and 18 respectively are provided for the longitudinal and transverse movements. The horizontal transverse displacement of the guide rails 10 with the charging and discharging trucks 8 and 9 for accepting the pressing package 3 into the charging region 14, for withdrawing the pressing package 3 from the pressing region 15, and for withdrawal from the discharging region 16, is performed in this case by motor in the same way in transverse rails 19.

For the exemplary embodiments according to FIGS. 2 to 4, the guide rails are subdivided into three parts, one specifically for the charging region 14, the pressing region 15 and the discharging region 16, while two support spars 11 are provided in each case for the charging and discharging trucks 8 and 9.

Each of the three regions is equipped with a dedicated drive 18 for the transverse movement. As a result, the charging device can deposit the new pressing package 3 in the press 1 irrespective of whether the discharging operation has already deposited the plate 4. The drive system for the object set is provided in a plurality of exemplary embodiments or solutions depending on the cycle time requirements:

First Exemplary Embodiment According to FIGS. 1a to 1e

The charging and discharging trucks 8 and 9 are connected to one another and continuous guide rails with support spars 11 are fitted with a common drive 21. They are drawn via a common drive beam 22 that is driven by an electric motor by means of chains or toothed belts. The drive beam 22 can be arranged on the charging side or, preferably, discharging side, and is separately guided on a dedicated frame 30.

The charging and discharging trucks 8 and 9 are additionally guided in a fashion rolling on the drive beam 22 for the purpose of transverse movement in this case.

FIG. 1a shows the charging and discharging trucks 8 and 9 in the charging and pressing regions 14 and 15 in the starting position on the supply axis III—III for the purpose of being inserted transversely onto the charging and discharging axis II—II. This movement is represented as already having been executed in FIG. 1b. After pressing package 3 is clamped by the clamping device 12, and the finished plate 4 is accepted by the suction device 13, according to FIG. 1c, the transport device 8, 9, 10, 11, 12 and 13 moves jointly into the pressing chamber 17 or into the discharging region 16. After plate 4 is deposited and the pressing package 3 has been deposited at the same time, in accordance with FIG. 1d, the guide rails 10 are moved back, with the components attached previously, onto the supply axis III—III from the charging and discharging axis II—II and, in accordance with FIG. 1e, returned by means of the drive beams 22 to the starting position according to FIG. 1a.

Figure 2A:
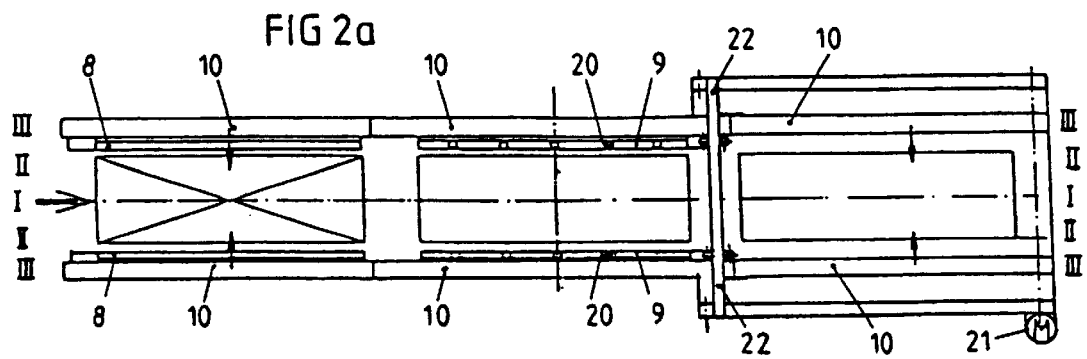
FIGS. 2a, 2b, and 2c show the kinematic sequence (a to c) of the device according to the invention for charging and discharging a short-cycle press of a second design.
Figure 2B:
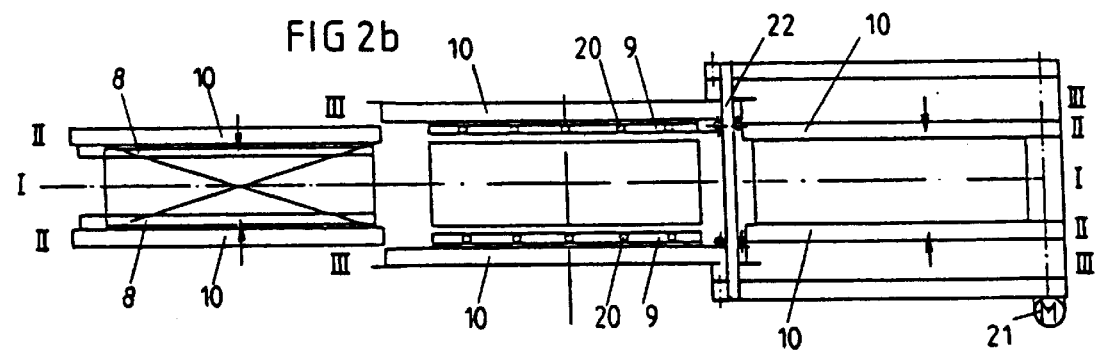
Figure 2C:
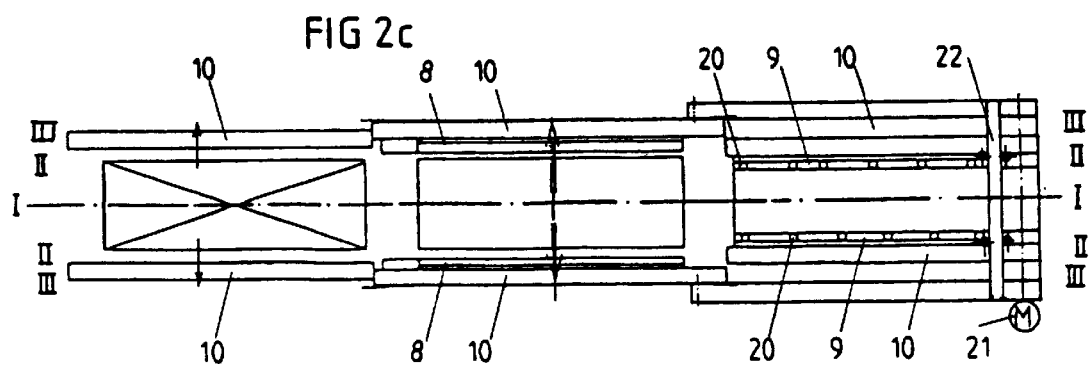
Figure 4A:
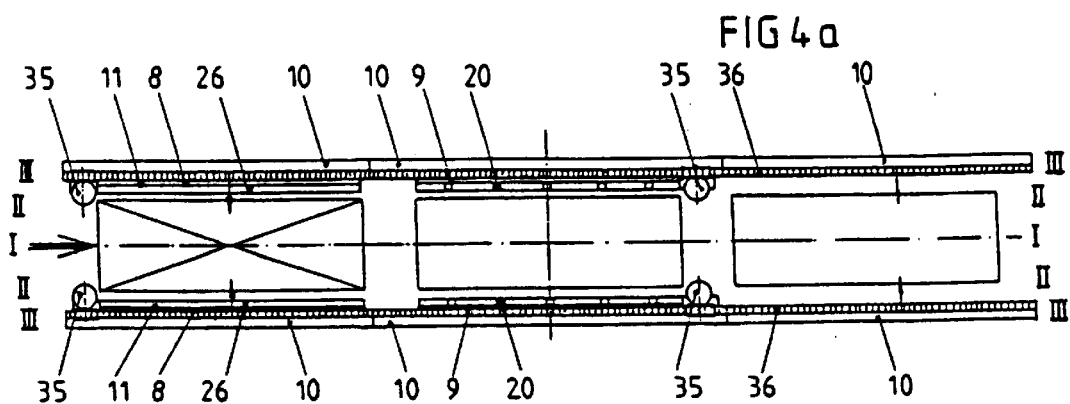
FIGS. 4a, 4b, 4c, and 4d show the kinematic sequence (a to d) of the device according to the invention for charging and discharging a short-cycle press of a fourth design.
Figure 4B:
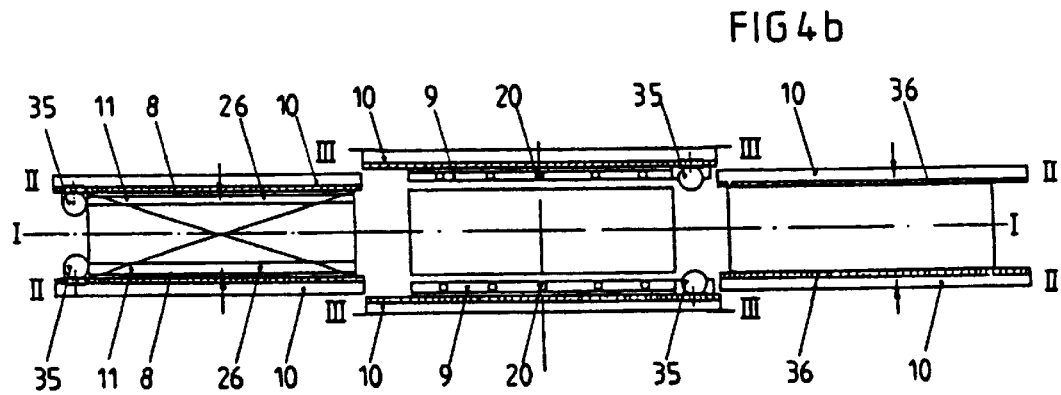
Figure 4C:
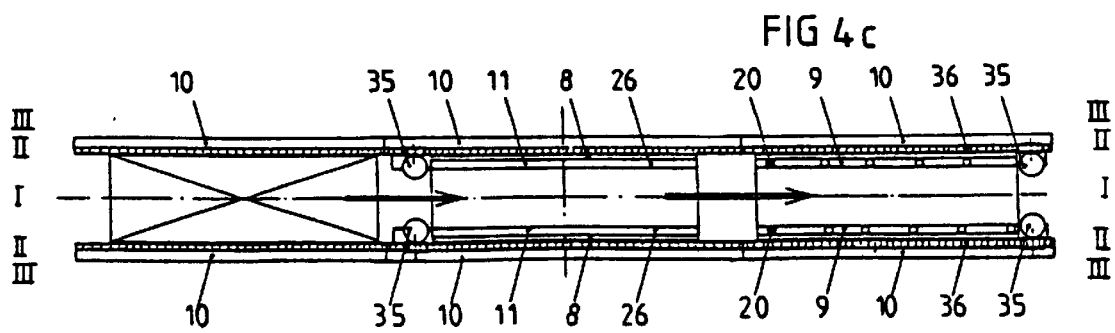
Figure 4D:
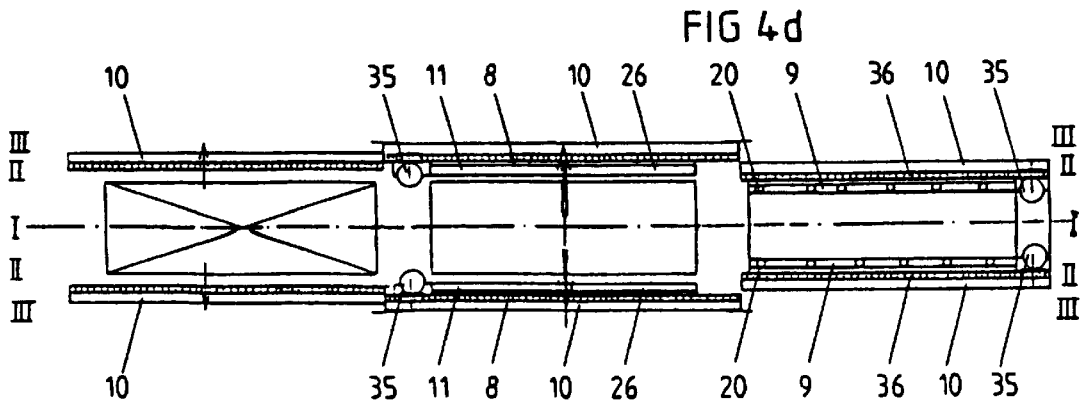
Figure 6:
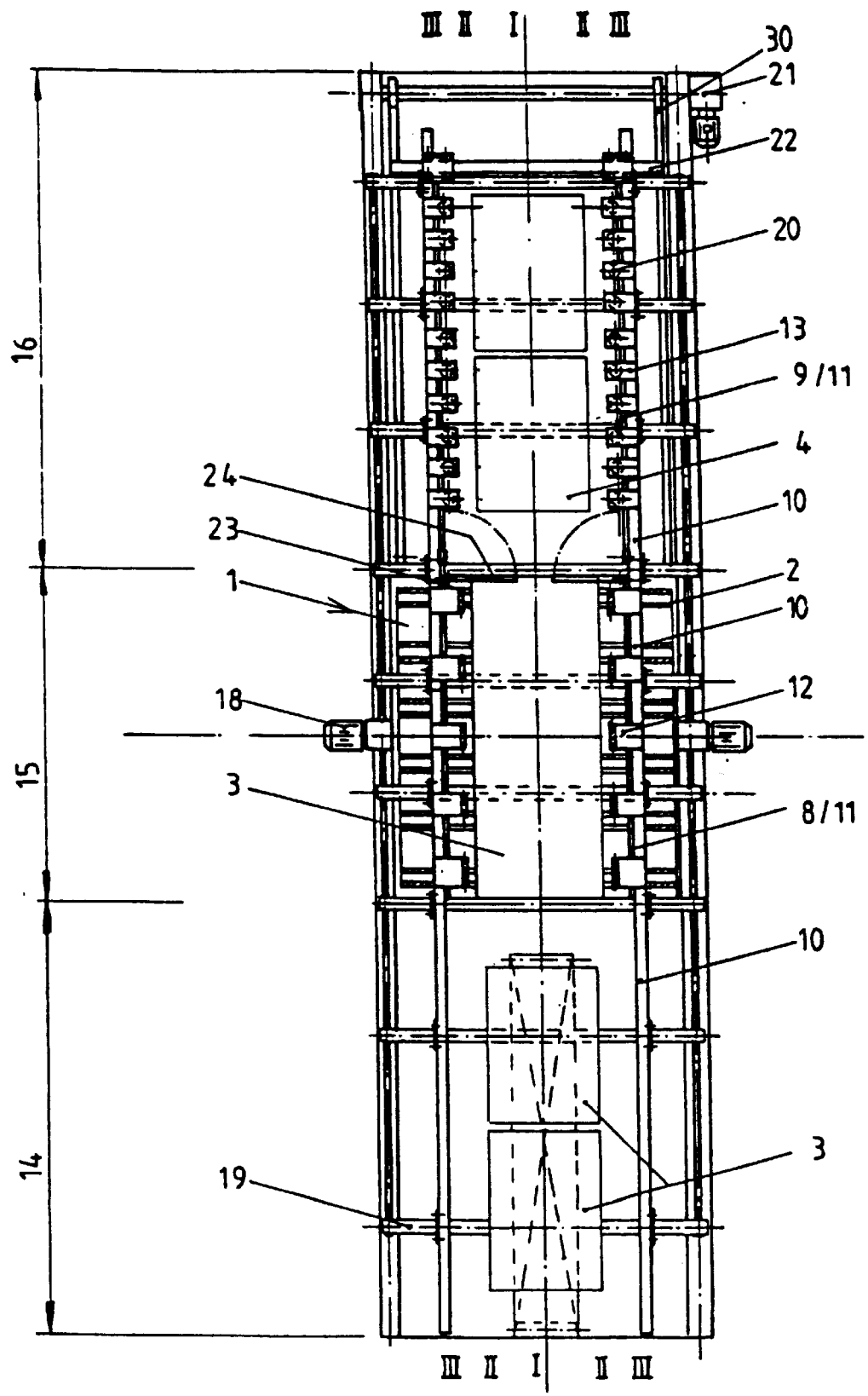
FIG. 6 is a plan view taken along the section A—A of the device according to FIG. 5.

Second Exemplary Embodiment with Divided, that is to Say Separate Guide Rails 10 According to FIGS. 2a to 2c In this version, the charging and discharging trucks 8 and 9 are connected to one another for charging and discharging and can be coupled via couplings or latches 29 which can be driven pneumatically, electromagnetically or by electric motor. If the couplings 29 are opened, the charging and discharging trucks 8 and 9 can be moved transversely independently of one another. The non-driven part is simultaneously locked against being moved on the guide rails 10 by opening the couplings 29. As FIGS. 2a to 2c further show, the mutually separated charging truck 8 and discharging truck 9 can move transversely independently of one another from the supply axis III—III onto the charging and discharging axis II—II and back or be moved jointly longitudinally by one transport device 8, 9, 10, 11 and 12 or 13 in each case. The drive and the sequence of movement in the pressing cycle are performed as in the first embodiment. However, this version has longer cycle times due to the independence between charging and discharging with individual drives.

Third Exemplary Embodiment According to FIGS. 3a to 3d

Extended version with separate control drives for charging and discharging, separate guide rails 10 and separate support spars 11 as well as mechanical synchronization of the charging and discharging half trucks 8 and 9. The drive is performed via one or two stationary drive units 34 per longitudinal side, in which case gearwheels 31 engage in gear racks 32 on the charging and discharging trucks 8 and 9. The drive units 34 are arranged in a stationary fashion on the press 1 and provided such that they can be lifted out and moved transversely at the press inlet and press outlet for the purpose of transverse movement by means of the drive 18. For this purpose, the charging and discharging trucks 8 and 9 are not connected to one another. Greater flexibility and shorter cycle times result by comparison with the first and second embodiments. In addition, FIGS. 3a to 3d further illustrate the corresponding movement sequences of charging and discharging. In FIG. 3a, the charging truck 8 and the discharging truck 9 are in a waiting position on the supply axes III—III. According to FIG. 3b, the charging truck 8 can still be inserted transversely onto the charging axis II—II during pressing and accept and clamp the pressing package 3, while the discharging truck 9 can execute the transverse insertion and the common longitudinal movement only after opening of the press 1, as FIG. 3c shows. In FIG. 3d, the press is already closed and the charging truck 8 has been moved transversely from the charging axis II—II onto the supply axis III—III, while the discharging truck 9 can still deposit the plate 4. After the deposition, the discharging truck 9 likewise moves from the discharging axis II—II onto the supply axis III—III, and both can be returned to the waiting position according to FIG. 3a.

Fourth Exemplary Embodiment According to FIGS. 4a to 4d

Extended version with individual drives and divided guide rails 10. Each of the two charging and discharging half trucks 8 and 9 is equipped with a dedicated electric motor 35. The drive is performed via gearwheels 31 or the revolution of a toothed belt on a gear track 36 attached to the guide rails 10. The synchronization of the right-hand and left-hand half trucks is performed via electronic control axes or, alternatively, via mechanical compensating shafts. The movement sequences of charging, discharging and moving transversely and longitudinally are performed in accordance with the way outlined in FIG. 3.

According to FIGS. 7a and 7b, in the case of divided guide rails 10 according to exemplary embodiments II, III and IV as seen in FIGS. 2 to 4, the coupling is performed by means of a pneumatically controlled latch 29. In the closed position, the support spars 11 of the charging truck 8 and the support spars 11 of the discharging truck 9 are coupled by means of a locking latch 29. In the uncoupled state, the latch 29 brakes the charging truck 8, which has no drive in this position, by means of self-closure/frictional grip, in order to prevent movement in the longitudinal direction. In the uncoupled position, it is possible for the charging to carry out a transverse movement independently of the discharging, for example in order to accept or deposit the plates 4. In order to realize this, however, the drive 18 of the transverse movement must be divided into two or three, that is to say the drive is divided either at the press/charging interface or at the press inlet and outlet.

Priority application German 197 44 284.6 filed Oct. 7, 1997, including the specification, claims, drawings, and abstract, is hereby incorporated by reference.

What is claimed is:

1. A method for charging and discharging short-cycle and/or coating presses with layered pressing material in a pressing chamber which is located between a charging region and a discharging region and in which the pressing material is pressed into a plate, the method comprising:

a) opening the pressing chamber;

b) inserting, to a position in the charging region, a first transport device having a first guide rail and a plurality of clamping devices attached to the first guide rail, wherein the first guide rail is inserted linearly in a direction transverse to a longitudinal central axis from a pair of supply axes to a pair of charging and discharging axes, wherein each supply axis is located on an opposite side of the longitudinal central axis, wherein each charging and discharging axis is located on an opposite side of the longitudinal central axis between the longitudinal central axis and its respective supply axis, and wherein each charging and discharging axis is located further from the longitudinal central axis than from its respective supply axis;

c) inserting, to a position in the pressing chamber, a second transport device having a second guide rail and a plurality of suction devices attached to the second guide rail, wherein the second guide rail is inserted linearly in a direction transverse to the longitudinal central axis from the pair of supply axes to the pair of charging and discharging axes;

d) clamping the pressing material in the charging region;

e) grabbing the pressed plate in the pressing chamber;

f) moving the clamping devices into the pressing chamber while jointly moving the suction devices into the discharging region;

g) depositing the pressing material onto a lower heating element in the pressing chamber;

h) depositing the pressed plate in the discharging region;

i) withdrawing the clamping devices from the pressing chamber and the suction devices from the discharging region, wherein the first and second guide rails are withdrawn in a linear direction transverse to the longitudinal central axis from the pair of charging and discharging axes to the pair of supply axes; and j) returning the clamping devices to a first original position for a new cycle; and k) returning the suction devices to a second original position for a new cycle.

2. A method for charging and discharging short-cycle and/or coating presses with layered pressing material as claimed in claim 1, wherein the plurality of suction devices can be driven independently.

3. A method for charging and discharging short-cycle and/or coating presses with layered pressing material as claimed in claim 2, wherein the plurality of suction devices can be raised and lowered independently.

4. The method for charging and discharging short-cycle and/or coating presses with layered pressing material as claimed in claim 3, further comprising:

using the plurality of suction devices to peel the plate from the heating element in the pressing chamber.

5. A method for charging and discharging short-cycle and/or coating presses with layered pressing material as claimed in claim 1, wherein the pressing material is deposited in the pressing chamber by loosening the clamping devices simultaneously.

6. A method for charging and discharging short-cycle and/or coating presses with layered pressing material as claimed in claim 1, wherein the pressing material is deposited in the pressing chamber by loosening the clamping devices with a time delay.

7. A method for charging and discharging short-cycle and/or coating presses with layered pressing material as claimed in claim 1, wherein the first transport device is bipartite.

8. A method for charging and discharging short-cycle and/or coating presses with layered pressing material as claimed in claim 1, wherein the second transport device is bipartite.

9. The method for charging and discharging short-cycle and/or coating presses with layered pressing material as claimed in claim 1, further comprising:

provinding support beams to the first transport device, wherein the support beams extend from the first transport device toward the longitudinal central axis.

10. The method for charging and discharging short-cycle and/or coating presses with layered pressing material as claimed in claim 1, further comprising:

providing a windscreen to an end face of the first transport device to allow the first and the second transport devices to be operated at high speeds.

11. The method for charging and discharging short-cycle and/or coating presses with layered pressing material as claimed in claim 1, wherein the first and second guide rails are connected.

12. The method for charging and discharging short-cycle and/or coating presses with layered pressing material as claimed in claim 11, wherein the first and second guide rails move in unison.

13. The method for charging and discharging short-cycle and/or coating presses with layered pressing material as claimed in claim 1, wherein the first and second guide rails are driven separately.

14. A method for charging and discharging short-cycle and/or coating presses with layered pressing material in a pressing chamber which is located between a charging region and a discharging region and in which the pressing material is pressed into a plate, the method comprising:

a) inserting, to a position in the charging region, a first transport device having a first guide rail and a plurality of clamping devices attached to the first guide rail, wherein the first guide rail is inserted linearly in a direction transverse to a longitudinal central axis from a pair of supply axes to a pair of charging and discharging axes, wherein each supply axis is located on an opposite side of the longitudinal central axis, wherein each charging and discharging axis is located on an opposite side of the longitudinal central axis between the longitudinal central axis and its respective supply axis, and wherein each charging and discharging axis is located further from the longitudinal central axis than from its respective supply axis;

b) inserting, to a position in the pressing chamber, a second transport device having a second guide rail and a plurality of suction devices attached to the second guide rail, wherein the second guide rail is inserted linearly in a direction transverse to the longitudinal central axis from the pair of supply axes to the pair of charging and discharging axes;

c) clamping the pressing material to the first transport device;

d) opening the pressing chamber;

e) suctioning the plate in the pressing chamber to the second transport device;

f) moving the clamping devices into the pressing chamber and the suction devices into the discharging region;

g) depositing the pressing material onto a lower heating element in the pressing chamber;

h) withdrawing the clamping devices from the pressing chamber, wherein the first guide rail is withdrawn in a linear direction transverse to the longitudinal central axis from the pair of charging and discharging axes to the pair of supply axes;

i) depositing the plate in the discharging region;

j) withdrawing the suction devices from the discharging region, wherein the second guide rail is withdrawn in a linear direction transverse to the longitudinal central axis from the pair of charging and discharging axes to the pair of supply axes;

k) returning the clamping devices to a first original position; and l) returning the suction devices to a second original position.

15. A method for charging and discharging short-cycle and/or coating presses with layered pressing material as claimed in claim 14, wherein a plurality of dedicated drives move the first and second transport devices independently along the longitudinal central axis and transverse to the longitudinal central axis.

16. A method for charging and discharging short-cycle and/or coating presses with layered pressing material as claimed in claim 15, wherein the suction devices are driven independently.

17. A method for charging and discharging short-cycle and/or coating presses wit layered pressing material as claimed in claim 16, wherein the suction devices can be raised and lowered independently.

18. The method for charging and discharging short-cycle and/or coating presses with layered pressing material as claimed in claim 17, further comprising:

using the plurality of suction devices to peel the plate from the heating element in the pressing chamber.

19. A method for charging and discharging short-cycle and/or coating presses with layered pressing material as claimed in claim 14, wherein the pressing material is deposited in the pressing chamber by loosening the clamping devices simultaneously.

20. A method for charging and discharging short-cycle and/or coating presses with layered pressing material as claimed in claim 14, wherein the pressing material is deposited in the pressing chamber by loosening the clamping devices with a time delay.

21. A method for charging and discharging short-cycle and/or coating presses with layered pressing material as claimed in claim 14, wherein the first transport device is bipartite.

22. A method for charging and discharging short-cycle and/or coating presses with layered pressing material as claimed in claim 14, wherein the second transport device is bipartite.

23. The method for charging and discharging short-cycle and/or coating presses with layered pressing material as claimed in claim 14, further comprising:

providing support beams to the first transport device, wherein the support beams extend from the first transport device toward the longitudinal central axis.

24. The method for charging and discharging short-cycle and/or coating presses with layered pressing material as claimed in claim 14, further comprising:

providing a windscreen to an end face of the first transport device to allow the first and the second transport devices to be operated at high speeds.

25. The method for charging and discharging, short-cycle and/or coating presses with layered pressing material as claimed in claim 14, wherein the first and second guide rails are connected.

26. The method for charging and discharging short-cycle and/or coating presses with layered pressing material as claimed in claim 25, wherein the first and second guide rails move in unison.

27. The method for charging and discharging short-cycle and/or coating presses with layered pressing material as claimed in claim 14, wherein the first and second guide rails are driven separately.

28. A method for charging and discharging short-cycle and/or coating presses with layered pressing material in a pressing chamber which is located between a charging region and a discharging region and in which the pressing material is pressed into a plate, the method comprising:

a) opening the pressing chamber;

b) inserting, to a position in the charging region and transverse to a longitudinal central axis, a first transport device, the first transport device including a plurality of clamping devices and a first guide rail, wherein the first guide rail moves from a pair of supply axes to a to pair of charging axes, wherein each supply axis is located on an opposite side of the longitudinal central axis, wherein each charging axis is located on opposite sides of the longitudinal central axis between the longitudinal central axis and its respective supply axis, and wherein each charging axis is closer to its respective supply axis than to the longitudinal central axis;

c) inserting, to a position in the pressing chamber and transverse to the longitudinal central axis, a second transport device, the second transport device including a plurality of suction devices and a second guide rail, wherein the second guide rail moves from the pair of supply axes to a pair of discharging axes, wherein each discharging axis is located on opposite sides of the longitudinal central axis between the longitudinal central axis and its respective supply axis, and wherein each discharging axis is closer to its respective supply axis than to the longitudinal central axis;

d) providing support beams to the first transport device, wherein the support beams extend from the first transport device toward the longitudinal central axis;

e) clamping the pressing material in the charging region;

f) moving the clamping devices into the pressing chamber while jointly moving the suction devices into the discharging region;

g) depositing the pressing material onto a heating element in the pressing chamber;

h) depositing the pressed plate in the discharging region;

i) withdrawing, linearly and in a direction transverse to the longitudinal central axis, the first guide rail from the pair of charging axes to the pair of supply axes;

j) withdrawing, linearly and in a direction transverse to the longitudinal central axis, the second guide rail from the pair of discharging axes to the pair of supply axes;

k) returning the clamping devices to a first original position for a new cycle; and l) returning the suction devices to a second original position for a new cycle.

29. The method for charging and discharging short-cycle and/or coating presses with layered pressing material as claimed in claim 28, further comprising:

providing a windscreen to an end face of the first transport device to allow the first and the second transport devices to be operated at high speeds; and using the plurality of suction devices to peel the plate from the heating element in the pressing chamber.

30. The method for charging and discharging short-cycle and/or coating presses with layered pressing material as claimed in claim 28, wherein the first and second guide rails are connected.

31. The method for charging and discharging short-cycle and/or coating presses with layered pressing material as claimed in claim 30, wherein the first and second guide rails move in unison.

32. The method for charging and discharging short-cycle and/or coating presses with layered pressing material as claimed in claim 28, wherein the first and second guide rails are driven separately.

* * * * *